United States Patent [19]

Davis

[11] Patent Number: 4,762,140
[45] Date of Patent: Aug. 9, 1988

[54] SNAP-OFF PLUG VALVE

[76] Inventor: Edward A. Davis, 1238 Green La., La Canada-Flintridge, Calif. 91011

[21] Appl. No.: 56,132

[22] Filed: May 28, 1987

[51] Int. Cl.⁴ ............................................. F16K 17/40
[52] U.S. Cl. ...................................... 137/71; 137/68.1
[58] Field of Search ................................. 137/68.1, 71

[56] References Cited

U.S. PATENT DOCUMENTS

| | | | |
|---|---|---|---|
| 733,372 | 7/1903 | Colwell | 137/71 |
| 1,311,774 | 7/1919 | Bitter | 137/71 |
| 2,804,317 | 8/1957 | Prater | 137/68.1 |
| 3,995,694 | 12/1976 | Freiburger | 137/71 |
| 4,077,422 | 3/1978 | Brinkley | 137/68.1 |
| 4,562,962 | 1/1986 | Hartman | 137/68.1 X |

Primary Examiner—John Rivell
Attorney, Agent, or Firm—Donald D. Mon

[57] ABSTRACT

Disclosed is a plug valve for installation in a water supply line which will shut off flow through the line when a downstream emitting element, such as a sprinkler head, is destructively removed from the line. A fracture groove on the exterior of the valve body defines a structurally weakest point and is axially located on the body between an upstream valve seat and a downstream limit stop. The limit stop maintains the valve in an open position during normal operation. Should the downstream emitting element be destructively removed, the supply line will break at its weakest point. The limit stop, being located downstream of the weakest point, will also be removed allowing the valve to close in response to inlet water pressure only, preventing loss of water from the supply line.

5 Claims, 1 Drawing Sheet

SNAP-OFF PLUG VALVE

FIELD OF THE INVENTION

This invention relates to a plug valve for installation in a water supply line which will shut off flow through the line when a downstream emitting element such as a sprinkler is impacted with such force as would distort or break the line.

BACKGROUND OF THE INVENTION

Water supply lines commonly supply water to an emitting element such as a sprinkler head, bubbler or spray head. Basic control over the supply of water is generally exerted by an upstream control valve, often on a timer circuit, whereby the emission of water occurs automatically and generally without immediate supervision. This is a widely used system concept, and is a very successful one.

However, problems do arise should the emitting element be impacted with such force as to distort or to break the supply line. If the line is merely distorted rather than broken, the water will not go to its intended place. Instead it will go in some other direction and place and perhaps do damage. For example, a sprinkler next to a highway which directs water onto the highway is likely to cause disruption of traffic, involving unsafe lane changes. At the least it will wet cars and perhaps their occupants to their annoyance.

Should the line be broken, then a vigorous stream will again be directed toward some undesired place such as a highway or even a structure, so as to wet or to flood it.

In any event, a considerable volume of water will ordinarily be wasted before anyone notices the event, or is notified of it. In addition to the wastage, nuisances, damages, and dangers as suggested above may result.

Automatic shut off valves responsive to downstream conditions have been proposed. However, they are surprisingly complex, and do not contain within themselves a force-responsive means that assures that the valve will function when a force is exerted that is sufficient to distort or to break the line. Forces of the types contemplated are, as examples, blows or other distortive forces exerted by wheels of vehicles, lawn mower blades and golf clubs. Emitting elements such as sprinkler heads, spray heads, and bubblers are contemplated. Common examples of an event to which is valve is responsive are the cutting off of a sprinkler head by a powered lawn mower, or the ramming of a riser pipe by a golf cart or a service truck.

It is the object of this invention to provide a valve which will shut off the flow of water when a suitably large force is exerted on the line, this valve operating as a weakest physical link in the system.

BRIEF DESCRIPTION OF THE INVENTION

A snap-off plug valve according to this invention comprises a body having a flow passage therethrough from end to end. At one end the body receives a pipe that forms part of a water supply line. At the other end it receives a water-emitting element such as a sprinkler, or a pipe which itself leads to and is structurally integral with the emitting element.

An annular peripheral valve seat is formed in the flow passage, projecting radially therein. A valve poppet is loosely fitted in and extends on both sides of the valve seat. It has a head on the downstream side of the valve seat that fits in a relief in the side of the passage so the poppet can move axially in the seat. A peripheral valve seal is fitted to the poppet on its upstream side. Its radial dimensions are such as to overhang the valve seat but with a clearance that permits flow, and at certain times to bear against the valve seat to close the valve.

A by-pass passage extends through the poppet from a point downstream of the valve seal, to the downstream end of the poppet.

Limit means is provided to limit the upstream movement of the poppet when the system is functioning properly, so as to hold the valve seal off of the valve seat. A fracture groove is formed in the body having such dimensions as to fracture when a sufficient force is exerted. This will remove the limit means and enable the poppet to move and stop the flow of water. It acts as a weakest structural link.

According to a preferred but optional feature of the invention, the limit means is the end of a pipe segment inserted into the valve body, which segment might be a portion of the emitting element itself, for example the threaded end of the neck of a sprinkler head.

The above and other features of the invention will be fully understood from the following detailed description and the accompanying drawings, in which:

DETAILED DESCRIPTION OF THE INVENTION

Figure 1:
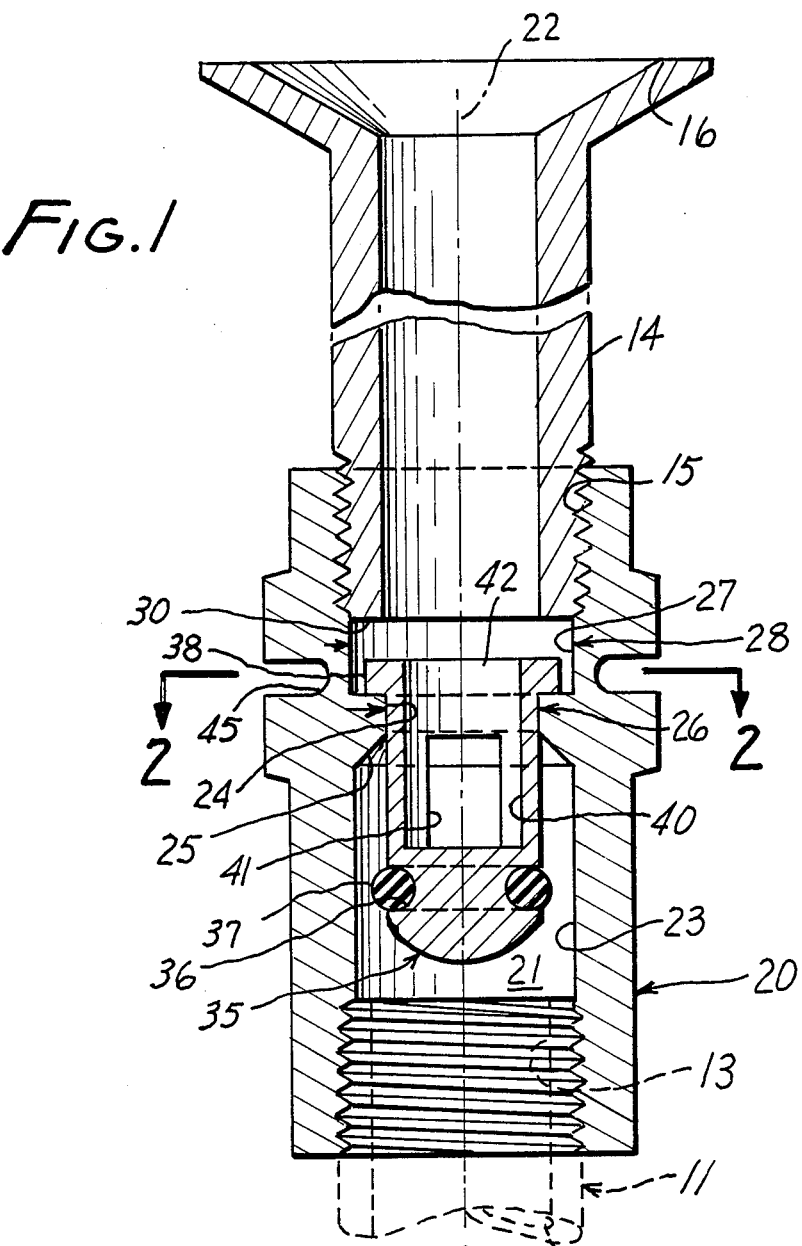
FIG. 1 is an axial cross-section showing the presently-preferred embodiment of the invention.
Figure 2:
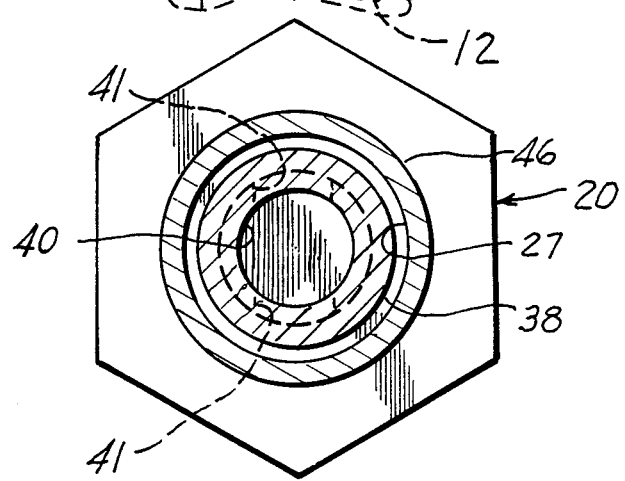
FIG. 2 is a cross-section taken at line 2—2 in FIG. 1.

A snap-off plug valve 10 according to the invention is shown in FIG. 1 plumbed into a water supply line 11 a pipe segment 12 of which is threaded into an inlet port 13. Another pipe segment 14 is threaded into an outlet port 15. Instead of threads, solvent welding techniques may be used as desired. A water-emitting element 16, in this example a sprinkler head, is connected to pipe segment 14. Pipe segment 14 may and often will be an integral part of the element itself, for example the neck of the sprinkler head. Instead it might be a riser pipe leading to an elevated sprinkler head.

Valve 10 has a body 20 with a flow passage 21 passing therethrough. The ports are formed as the terminal ends of the passage. The passage has an axis 22 and an inside peripheral wall 23. An annular valve seat 24 projects radially from the wall into the passage. Its upstream face 25 is preferably frusto-conical, although it can be shaped otherwise if preferred. The seat has an internal diameter 26 smaller than the diameter of the wall upstream from it.

At the downstream side of the valve seat the wall is formed with a relief 27. Its diameter 28 is larger than diameter 26, although it may be the same as the upstream diameter of the wall.

Limit means 30 is provided as a shoulder extending radially in from relief 27, spaced downstream from the valve seat. Most conveniently, limit means 30 will comprise the end of the pipe segment fitted to the outlet port.

A poppet 35 is loosely fitted in the valve seat, and projects past it, both upstream and downstream. Around its upstream portion there is a ring groove 36 to receive and seat a ring seal 37. The ring seal will conveniently be an elastomeric O-ring, whose outermost diameter is larger than diameter 26 of the valve seat, and smaller than the diameter of the upstream wall portion.

A head 38 is formed on the poppet at its downstream end. Its diameter is larger than diameter 26, and smaller than that of the relief. Importantly, it is larger than that of limit means 30, so that when light means 30 is in place, the axial movement of the poppet is limited to the range established by contact of the head with the valve seat and with the limit means. This will hold the seal ring away from the seat, and the valve will stay open.

Flow past the poppet is enabled by a by-pass passage 40 with one opening 41 located downstream from the ring, and another opening 42 at the downstream end of the poppet. When the ring is not seated, water can flow through passage 40. When the ring is seated, passage 40 is closed, and the valve is firmly closed by the fluid pressure.

The valve body may be made of any suitable material such as metal or of organic plastic materials. Suitably hard and durable polyvinyl chloride formulations are useful.

It is the object of this invention to free the poppet to close the valve when a suitably strong force is exerted on the valve, the valve body acting as a structural weakest link. For example, a sufficent blow on the line downstream from the valve can exert such a force on the valve body as to break it and free the poppet. For this purpose, a peripheral fracture groove 45 is formed in the outside wall of the body, forming a reduced annular ring 46 whose cross-section offers the least resistance to fracture along the length of the body. Suitable dimensions of this cross-section can readily be determined, even by trial-and-error, once the forces to be responded to are decided. It will be observed that this groove is downstream from the valve seat, so that the downstream side of the valve body does not have to respond to full system pressure after the fracture. Generally, the other system components are "stronger" than the reduced section, so that fracture occurs at groove 45.

The operation of the valve should be evident from the foregoing. The valve is shown in its repose condition. When the water supply is turned on, the poppet will move downstream until the head abuts the limit means. The valve is open to flow through passage 40, because the seal cannot reach the seat.

Should a sufficient force be exerted on the structure, the valve body will break off at fracture groove 45. This will remove the limit means, and the valve poppet will not be moved axially so that the seal abuts the valve seat and shuts off the flow. System pressure will cause and maintain this closure.

This plug valve thereby enables flow of water when the system is intact, but itself is a weak link responsive to disruptive forces to shut off the flow when the system is sufficiently damaged. It is readily manufactured by routine molding or machining procedures, and is quite economical.

This invention is not to be limited by the embodiment shown in the drawings and described in the description, which is given by way of example and not of limitation, but only in accordance with the scope of the appended claims.

I claim:

1. A snap-off plug valve having a body with an axial flow passage, a peripheral wall therethrough, an inlet port and an outlet port to said passage, a peripheral valve seat in said passage projecting radially into said passage with an upsteam face and an internal diameter smaller than the diameter of the wall upstream from said valve seat, a relief in said wall downstream from said valve seat, with a diameter larger than the internal diameter of said valve seat, limit means overhanging said relief spaced downstream from said valve seat, a poppet passing through and slidably fitted in said valve seat, a head on said poppet loosely fitted in said relief and having radial dimensions such as to abut said limit means when brought against it, a peripheral valve seal carried by said poppet at the upstream side of said valve seat, a by-pass passage through said poppet from a point downstream from said valve seal to the downstream end of said poppet, and a fracture groove formed in said body located axially between said valve seat and said limit means which establishes an annular region of least structural resistance to distortive forces, whereby water flowing through said flow passage only, causes said head to abut said limit means and the valve seal will be held away from the valve seat and water can flow through said by-pass passage, and whereby when the body is fractured at said fracture groove, the poppet can be moved by fluid pressure to press the valve seal against the valve seat and close the valve.

2. A valve according to claim 1 in which said limit means comprises the end of a conduit segment fitted to said body.

3. A valve according to claim 1 in which said valve seal is a circularly sectioned O-ring.

4. A valve according to claim 3 in which said valve seat is frusto-conical, the valve seal and valve seat radially overlapping one another.

5. A valve according to claim 4 in which said limit means comprises the end of a conduit segment fitted to said body.

* * * * *